United States Patent
Hosokawa et al.

(10) Patent No.: US 8,207,073 B2
(45) Date of Patent: Jun. 26, 2012

(54) HIGHLY WATER PRESSURE-RESISTANT POLYESTER NONWOVEN FABRIC

(75) Inventors: Tomoyuki Hosokawa, Moriyama (JP); Ryuji Suzuka, Moriyama (JP)

(73) Assignee: Asahi Kasei Fibers Corporation, Osaka-Shi (JP)

( * ) Notice: Subject to any disclaimer, the term of this patent is extended or adjusted under 35 U.S.C. 154(b) by 312 days.

(21) Appl. No.: 10/549,359

(22) PCT Filed: Mar. 18, 2004

(86) PCT No.: PCT/JP2004/003644
§ 371 (c)(1),
(2), (4) Date: Sep. 14, 2005

(87) PCT Pub. No.: WO2004/082930
PCT Pub. Date: Sep. 30, 2004

(65) Prior Publication Data
US 2006/0172637 A1  Aug. 3, 2006

(30) Foreign Application Priority Data
Mar. 19, 2003 (JP) .................. 2003-074705

(51) Int. Cl.
*B32B 5/26* (2006.01)
*D04H 1/00* (2006.01)
*D04H 3/00* (2012.01)
*D04H 5/00* (2012.01)

(52) U.S. Cl. ......... 442/361; 442/381; 442/389; 442/400

(58) Field of Classification Search .......... 442/345, 442/347, 363, 199, 311, 361, 381, 389, 400; 428/372–374
See application file for complete search history.

(56) References Cited

U.S. PATENT DOCUMENTS

| | | | | |
|---|---|---|---|---|
| 5,108,827 A | * | 4/1992 | Gessner | 428/219 |
| 5,178,931 A | * | 1/1993 | Perkins et al. | 428/198 |
| 5,294,482 A | * | 3/1994 | Gessner | 442/346 |
| 5,593,768 A | * | 1/1997 | Gessner | 442/346 |
| 6,174,602 B1 | * | 1/2001 | Matsui et al. | 428/373 |
| 6,548,431 B1 | * | 4/2003 | Bansal et al. | 442/327 |

FOREIGN PATENT DOCUMENTS

| | | | |
|---|---|---|---|
| JP | 7-207566 | | 8/1995 |
| JP | 07-207566 | * | 8/1995 |
| JP | 10-204764 | | 8/1998 |
| JP | 11-247061 | | 9/1999 |
| JP | 2001-504723 | | 4/2001 |
| JP | 2002-356958 | | 12/2002 |

* cited by examiner

*Primary Examiner* — Matthew Matzek
(74) *Attorney, Agent, or Firm* — Finnegan, Henderson, Farabow, Garrett & Dunner, L.L.P.

(57) ABSTRACT

A highly water pressure-resistant polyester nonwoven fabric having a water pressure resistance of 2 kPA or more and composed of a laminated nonwoven fabric structure that is integrated by thermocompressive bonding an extremely fine fiber nonwoven fabric layer in which a polyester material is mixed with 1% or more of a polyolefin material and which has a fiber diameter of 5 μm or less, and a polyester filamentary fiber nonwoven fabric layer having a fiber diameter of 7 μm or more. The polyester nonwoven fabric is a nonwoven fabric material appropriate to moisture-permeable waterproof sheets used for building materials and shoe materials and, moreover, to fields requiring filtering properties, for example, various packaging materials such as dry packaging materials used as packaging materials and sterilization packaging materials also required to have radiation resistance and peel strength.

8 Claims, 3 Drawing Sheets

HIGHLY WATER PRESSURE-RESISTANT POLYESTER NONWOVEN FABRIC

TECHNICAL FIELD

The present invention relates to a highly water pressure-resistant polyester nonwoven fabric useful in the fields requiring a high water pressure resistance as well as air permeability, moisture permeability, strength and heat resistance, for example, moisture-permeable waterproof sheets used for building materials, and the like, and shoe materials, in the fields requiring filtering properties, for example, packaging materials such as a dry packaging material, and sterilization packaging materials that are also required to have radiation resistance and peel strength.

DESCRIPTION OF THE RELATED ART

Integrating an extremely fine fiber nonwoven fabric layer and a filamentary fiber nonwoven fabric layer by stacking and thermocompressively bonding the two layers has heretofore been widely conducted. Although a nonwoven fabric for which a polyolefin resin that is a hydrophobic material such as polypropylene is used is excellent in water resistance, it is poor in heat resistance due to a low melting point of the resin and shows little strength. Therefore, the nonwoven fabric is not a material that is adapted to applications required to have these properties as performances.

Although a nonwoven fabric obtained by flash spinning a polyethylene that is represented by Tyvek (trade name) shows a high water resistance and a high tenacity, it shows poor heat resistance in comparison with a nonwoven fabric for which a polyester resin material alone is used. On the other hand, although a nonwoven fabric obtained from a polyester resin material alone is excellent in strength and heat resistance, it is poor in hydrophobic properties. The nonwoven fabric is therefore a material unsuitable for the field requiring a high water resistance.

An attempt has been made to impart a high tenacity and a water resistance by stacking a polyester filamentary fiber nonwoven fabric layer disclosed in Japanese Unexamined Patent Publication (Kokai) No. 11-247061 and a nonwoven fabric layer of extremely fine fibers of a polyolefin such as a polypropylene and applying a laminating method such as thermocompressive bonding or adhesion to the stacked structure to fix the structure. However, when a laminated structure of fiber layers in which a difference in the melting point between the fibers is significant is integrated by applying thermocompressive bonding thereto, the extremely fine fibers are melted, and the layer structure of the fibers falls out of shape. As a result, the problems that layer-to-layer peeling tends to take place, and the water resistance of the product nonwoven fabric is lowered, arises.

Furthermore, Japanese Unexamined Patent Publication (Kokai) No. 7-207566 discloses a multilayer structure nonwoven fabric which is obtained by laminating a nonwoven fabric layer composed of extremely fine fibers that are prepared by applying melt blowing to a mixture composition of a polyester resin material and a polyolefin resin material, and a filamentary fiber nonwoven fabric layer prepared by spun bonding, and laminating the two layers to each other by applying thermal embossing, in which stacked nonwoven fabrics are laminated to each other so that the multilayer nonwoven fabric has a high peel strength, which is excellent in flexibility and a feeling, and which has a filtering function. A laminated structure nonwoven fabric of a filamentary fiber nonwoven fabric layer and an extremely fine fiber nonwoven fabric layer that are both composed of polyester fibers alone significantly tends to show a poor flexibility. Although addition of a polypropylene extremely fine fiber layer component can mitigate lowering of the flexibility, a laminated nonwoven fabric having a high layer-to-layer peel strength cannot be obtained due to insufficient melt bonding of both fibers through the polypropylene lacking in compatibility.

The technologies disclosed in Japanese Unexamined Patent Publication (Kokai) No. 7-207566 give a nonwoven fabric in which a resin mixture of a polyester material and a polypropylene material is used for an extremely fine fiber layer, which comprises a polyester polymer approximately as a sheath portion and a polypropylene polymer approximately as a core portion, and which shows a high peel strength. Because a polypropylene that is a hydrophobic material is to be arranged approximately in the core portion in the cross section of each fiber, the effect of making the fiber surface hydrophobic cannot be obtained adequately and, even when a nonwoven fabric laminate is formed out of the fibers, high water pressure resistance cannot be obtained.

In the process of forming a laminate by laminating hydrophobic fiber nonwoven fabric layers, specifically when an extremely fine fiber nonwoven fabric layer having a low METSUKE (a low basis of weight) is treated singly, handling the nonwoven fabric sheet becomes extremely difficult due to the poor shape retention, and the production becomes economically disadvantageous because the operational cost during handling the nonwoven fabric layer increases.

DISCLOSURE OF THE INVENTION

An object of the present invention is to provide a highly water-resistant polyester nonwoven fabric excellent in water resistance and having a high heat resistance and a high tensile strength.

The present inventors have discovered that the above objects can be achieved by forming a laminated nonwoven fabric out of (1) an extremely fine fiber nonwoven fabric wherein the fibers are prepared by mixing a polyester resin with a specific amount of a polyolefin resin and melt extrusion spinning the mixture so that discontinuous hydrophobic points (areas) are scattered in a specific proportion in the fiber surface and (2) a filamentary fiber nonwoven fabric, and the present invention has thus been made.

The present invention provides a highly water pressure-resistant polyester nonwoven fabric composed of a laminated nonwoven fabric structure, wherein an extremely fine fiber nonwoven fabric layer composed of a polyester resin material that is mixed with 1% by weight or more of a polyolefin resin and having a fiber diameter of 5 μm or less, and a filamentary fiber nonwoven fabric layer mainly containing a polyester resin and having a fiber diameter of 7 μm or more are integrated by thermocompressive bonding, and the laminated structure has a water pressure resistance of 2 kPa or more.

The present invention will be explained below in detail.

The highly water pressure-resistant polyester nonwoven fabric of the invention is prepared by stacking nonwoven fabrics each containing fibers different from those of the other fabrics in fiber diameter and composition and thermally fixing the stacked structure of the stacked nonwoven fabrics by the action of hot calendering or the like, so that a singular high water pressure resistance is imparted to the polyester nonwoven fabric.

One of the nonwoven fabric layer components forming the stacked structure of the invention is a nonwoven fabric formed out of extremely fine fibers of a polyester resin containing a specific polyolefin resin in a specific proportion which are formed by melt blow spinning and which have a fiber diameter of 5 μm or less; the other one of the nonwoven fabric layer components is a filamentary fiber nonwoven fabric which is mainly formed out of a polyester resin and the fibers of which have a diameter of 7 μm or more, more preferably from 7 to 20 μm.

In the present invention, when a stacked structure in which specific two types of nonwoven fabrics that differ from each other in the resin composition and the fiber diameter are stacked is pressurized or thermocompressively bonded by hot calendering or the like as explained above, the melt sticking action of the polyolefin resin that occupies the surface of the polyester fibers forming each of the nonwoven fabrics causes heat melt sticking bonding among fibers and between nonwoven fabric layers, and the stacked structure is fixed.

The water resistance exhibited by the polyester nonwoven fabric of the invention is obtained by the structure wherein a hydrophobic polyolefin resin is discontinuously distributed in a scattered state in the fiber surface of the polyester extremely fine fibers forming the polyester extremely fine fiber nonwoven fabric component, and the scattered resin functions as hydrophobic points.

Figure 3:
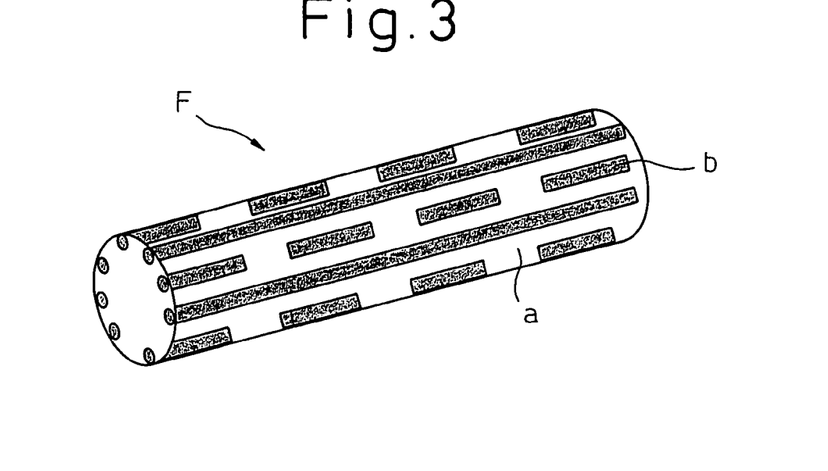
FIG. 3 is a schematic view of a scattered state of a longitudinally aligned polypropylene resin phase in the surface of extremely fine fibers of a polyolefin resin-containing polyester resin.

FIG. 3 schematically shows the discontinuously scattered and exposed state of a polyolefin phase (b) in a polyester phase (a) in the surface of the polyester extremely fine fiber (F).

As a result of observing the scattered state of a polyolefin resin phase in the phase of a polyester extremely fine fiber forming the extremely fine fiber nonwoven fabric layer in the present invention by the evaluation method (7) to be described later, the following has been confirmed: when a polyester extremely fine fiber is observed by SEM photographic observation after melting treatment of polyolefin, holes and linearly scattered traces from which the polyolefin has been melted, to fall out, are observed in the fiber surface; therefore, the extremely fine fiber has the structure that the polyolefin contained in the polyester resin that forms the extremely fine fiber is present in the surface of the fiber while bleeding out. Moreover, the following has been found: a nonwoven fabric formed from extremely fine fibers of a polyester resin that contains no polyolefin resin cannot manifest a water pressure resistance of 2 kPa or more even when the fiber layers are firmly heat bonded by calender rolling.

Polyester extremely fine fibers 5 μm in diameter or less that form the extremely fine fiber nonwoven fabric layer in the present invention are extremely fine fibers of a polyester resin composition containing 1% by weight or more of a polyolefin resin.

Figure 1:
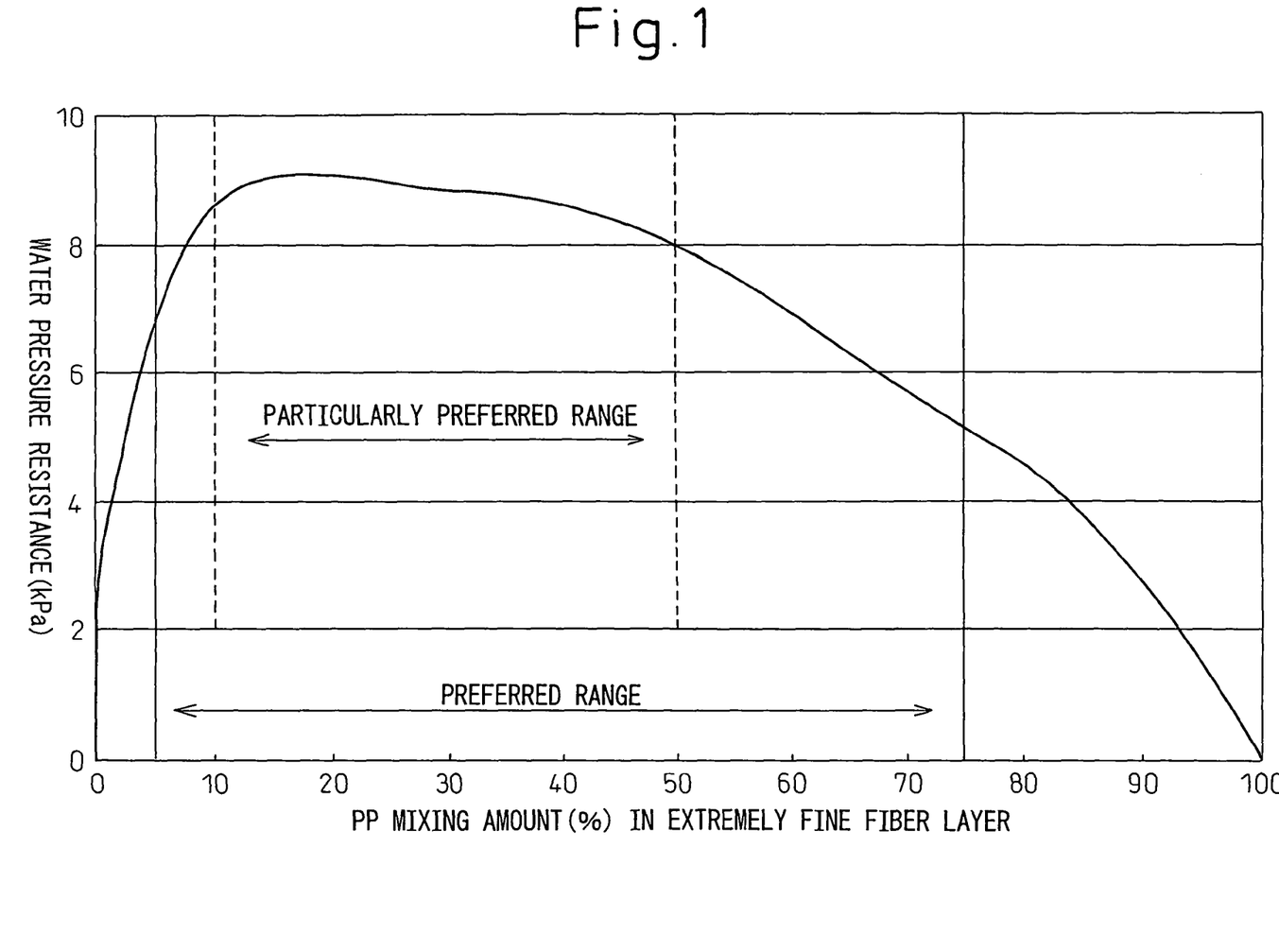
FIG. 1 is a graph showing the relationship between a mixing amount of a polypropylene resin in a polyester resin forming extremely fine fibers and a water pressure resistance of a laminate nonwoven fabric.

In order to obtain a higher water resistance, the mixing amount of the polyolefin resin in the extremely fine fiber layer is preferably from 5 to 75% by weight, and more preferably from 10 to 50% by weight. FIG. 1 shows, as one embodiment, the relationship between a mixing amount of a polypropylene resin that is a typical polyolefin resin and a water pressure resistance in Examples 1 to 7. The following is understood from the figure: when a polypropylene resin is mixed, even a small mixing amount tends to drastically improve the water pressure resistance; when the mixing amount of the polyolefin resin is from 10 to 50% by weight, the water pressure resistance becomes 7 kPa or more, and shows a maximum value, and the laminate has an extremely high water pressure resistance; when the mixing amount exceeds 50% by weight, the water pressure resistance slightly lowers, and tends to decrease to less than 7 kPa.

The polyester resin herein designates a thermoplastic polyester, and typical examples thereof include polyethylene terephthalate, polybutylene terephthalate and polytrimethylene terephthalate. The thermoplastic polyester may also be a polymerized or copolymerized polyester the acid component of which is isophthalic acid, phthalic acid or the like. Moreover, the polyester resin may also be a biodegradable resin such as a copolymer in which poly(α-hydroxy acid) such as polyglycolic acid or polylactic acid is contained as principal repeating units.

On the other hand, examples of the polyolefin to be added to or mixed with the polyester resin include polypropylene and polyethylene. The polypropylene may be a polymer synthesized with a common Ziegler-Natta catalyst, or it may also be a polymer synthesized with a single site-activated catalyst represented by metallocene. The polyethylene can be LLDPE (linear low-density polyethylene), LDPE (low density polyethylene), HDPE (high-density polyethylene), or the like. Moreover, the polyethylene can also be a copolymer of polypropylene and polyethylene, or it can also be a polymer in which polyethylene and other additives are added to polypropylene.

While a hydrophobic polyolefin resin is discontinuously present in the fiber surfaces, the fiber surfaces preferably have hot-adhesive polyester faces. It has been found that there are conditions of a preferred polyester resin composition necessary for preparing such polyester extremely fine fibers.

For the polyester resin viscosity, when the viscosity is too high, thinning the fiber diameter becomes difficult; on the other hand, when the viscosity is lowered, flies tends to be formed during the production process, and stabilized spinning becomes difficult. Accordingly, the solution viscosity is preferably from 0.2 to 0.8 $\eta_{sp}/C$, and more preferably from 0.2 to 0.6 $\eta_{sp}/C$. In addition, the solution viscosity is measured by dissolving 0.25 g of a sample in 25 ml of a solvent of o-chlorophenol, and conventionally determining the viscosity at a temperature of 35° C. For the structure of the extremely fine fiber nonwoven fabric layer, because discontinuous presence of the hydrophobic points in the fiber surface as shown in FIG. 3 is satisfactory, the hydrophobic points may also be in a scattered dot-like, linear or facial spot like pattern. However, when the structure has a complete sheath-core structure (e.g., a polyolefin in approximately in a sheath portion, and a polyester approximately in a core portion), integration by thermocompressive bonding unpreferably causes the following drawbacks: melt sticking of the extremely fine fiber nonwoven fabric layer and the filamentary fiber nonwoven fabric layer becomes incomplete to lower the peel strength, and the olefin bleeds or ooze out in the surface layer to cause the process problem that the roll surface is stained. Moreover, the extremely fine fiber nonwoven fabric layer shows a starting level of wetting and impregnating of 50 mN/m or less when a reagent having a surface tension different therefrom is dropped thereon, more preferably 40 mN/m or less. When the starting level exceeds 50 mN/m, the presence of the hydrophobic points in the fiber surfaces becomes incomplete. As a result, the water resistance of the laminated structure of the extremely fine fiber nonwoven fabric layer and the filamentary fiber nonwoven fabric layer also lowers. Using a melt indexer melt flow meter, the discharged amount of a molten polymer per 10 min at a test load of 21.18 N at the same temperature as in actual melt spinning is measured, and the amount is defined as a melt flow rate. When the polyolefin resin shows a larger melt flow rate than the polyester resin, the polyolefin resin is likely to bleed out easily. Accordingly, as to the polymer viscosity of the polyolefin resin to be used, the MFR should be 20 g/10 min or more. However, when the polyolefin resin tends to bleed or ooze out in the fiber surface, the hydrophobic effects of the fiber surface are more improved. The MFR of the polyolefin resin is therefore preferably 100 g/10 min or more, and more preferably from 500 to 3,000 g/10 min (the resin being a high flow type). In addition, measurements of the MFR are made in accordance with JIS K 7210, and the test conditions are as follows: a test temperature of 230° C.; and a test load of 21.18 N.

The polyester extremely fine fiber nonwoven fabric layer used in the present invention is prepared by the following procedure: the above polyolefin resin is mixed with the thermoplastic polyester resin in an extruder to give a molten material of a polyester resin composition; the molten material is discharged by melt blow spinning through melt blowing nozzles to deposit on a collecting surface as extremely fine fibers. Specific embodiments of the production method by melt blowing are described in, for example, Japanese Examined Patent Publication (Kokoku) Nos. 62-2062 and 56-33511.

The diameter of fibers forming the extremely fine fiber nonwoven fabric layer is 5 μm or less, preferably from 0.5 to 3 μm, and particularly preferably from 0.5 to 2 μm.

The water resistance is more improved when the fiber diameter is made smaller. However, when the fiber diameter is less than 0.5 μm, the fibers tend to be broken, and fly tends to be formed during the production process; stabilized spinning becomes difficult. Although there is a method of decreasing a discharging amount of the polymer per spinning nozzle hole in the spinning process, the method lowers the productivity, and is economically unpreferable. On the other hand, when the fiber diameter exceeds 5 μm, a fiber-to-fiber gap increases, and adequate water-resistant properties cannot be obtained.

The polyester filamentary fiber nonwoven fabric layer having a fiber diameter of 7 μm or more is formed out of a nonwoven fabric that is formed out of polyester filamentary fibers having a fiber diameter of 7 μm or more prepared by applying the production method of a spun-bonded nonwoven fabric described in, for example, Japanese Examined Patent Publication Nos. 49-30861 and 37-4993, and the like to a thermoplastic polyester resin.

The polyester resin herein refers to a polyethylene terephthalate, a polybutylene terephthalate and a polytrimethylene terephthalate, and it also refers to a polyester in which isophthalic acid, phthalic acid or the like is polymerized. Moreover, the polyester resin may also be a biodegradable resin, for example, a copolymerized polyester in which poly(α-hydroxy acid) such as polyglycolic acid or polylactic acid is contained as principal repeating units. Moreover, the polyester resin may also be a resin composition obtained by mixing a polyester resin for the polyester filamentary fiber nonwoven fabric with a polyolefin resin in an amount not exceeding 7% by weight based on the polyester. The polyolefin resin to be mixed may be a polymer or a copolymer selected from the polyolefin resin to be mixed with the polyester resin that is to form the extremely fine fiber nonwoven fabric.

The polyester filamentary fiber nonwoven fabric containing such a polyolefin resin shows excellent hydrophobic effects when moisture sticks to the surface, an improved starting level of wetting and impregnating when a reagent having a surface tension different from that of the nonwoven fabric is dropped thereon, and improved prevention of water penetration. Mixing a polyolefin resin with a polyester material for the polyester filamentary fiber nonwoven fabric improves the hydrophobic effects of the surface when the mixing amount is increased. However, in order to conduct stabilized spinning, a mixing amount of 3% by weight or less is most preferred.

The nonwoven fabric laminate of the invention composed of an extremely fine fiber nonwoven fabric layer and a filamentary fiber nonwoven fabric layer is prepared to have a METSUKE (=basis of weight) of 10 g/m$^2$ or more. The METSUKE as a component of the extremely fine fiber nonwoven fabric layer in the nonwoven fabric laminate must be 2 g/m$^2$ or more, and the METSUKE as a component of the filamentary fiber nonwoven fabric layer therein must be 8 g/m$^2$ or more.

Water-resistant properties are imparted to the nonwoven fabric laminate according to the present invention mainly by the properties of the extremely fine fiber nonwoven fabric layer. Because a nonwoven fabric formed out of an extremely fine fiber layer alone lacks in strength to such a degree that the nonwoven fabric structure is pore-opened when water pressure is applied to the nonwoven fabric structure, the nonwoven fabric cannot manifest the water-resistant properties adequately. On the other hand, when the METSUKE the filamentary fiber nonwoven fabric layer occupies in the nonwoven fabric laminate is less than 8 g/m$^2$, a strength to guard the extremely fine fiber nonwoven fabric layer arranged in the laminated structure without destruction of the fabric layer cannot be obtained. As a result, the water resistance is decreased. When the METSUKE of the extremely fine fiber layer in the laminated structure is made less than 2 g/m$^2$, improvement of the water resistant properties cannot be desired, and the productivity is unpreferably lowered. When the nonwoven fabric laminate of the invention is used for materials such as packaging materials, building materials or shoe materials, a still higher tenacity and a still higher water pressure resistance are required. It is therefore preferred to design the following METSUKE: a METSUKE of 40 g/m$^2$ or more for the stacked structure; a METSUKE of 20 g/m$^2$ or more for the filamentary fiber nonwoven fabric layer; and a METSUKE of 6 g/m$^2$ or more for the extremely fine fiber nonwoven fabric layer.

The highly water pressure-resistant polyester nonwoven fabric of the invention is obtained by laminating a filamentary fiber nonwoven fabric layer and an extremely fine fiber nonwoven fabric layer in this order, and integrating them by thermocompressive bonding. For the constituent fibers of the extremely fine fiber nonwoven fabric layer, the polyester forming the fibers has a low crystallization degree, and a polyolefin resin is present in the fiber surfaces. As a result, in fixing the structure of the stacked nonwoven fabrics, when the stacked nonwoven fabrics are directly contacted with heated press rolls, the rolls are likely to remove the nonwoven fabrics. For reasons explained above, the laminated nonwoven fabric is preferably prepared in the following procedure: a filamentary fiber nonwoven fabric layer, an extremely fine fiber nonwoven fabric layer and a filamentary fiber nonwoven fabric layer are stacked in this order, and the stacked fabric layers are integrated by thermocompressive bonding. The contents of the stacked structure may also be, for example, a multilayer stacked structure, wherein the extremely fine fiber nonwoven fabric layer is made double layers, or two filamentary fiber nonwoven fabric layers are placed as an upper layer and a lower layer with the extremely fine fiber layer placed between the upper and the lower layer as an intermediate layer.

The highly water pressure-resistant polyester nonwoven fabric according to the present invention is produced in the following procedure: filamentary fibers and extremely fine fibers are stacked in a sheet-like form, and the multilayer sheet-like stacked web body is thermocompressively bonded with flat rolls or emboss rolls to fix the stacked structure.

Figure 4:
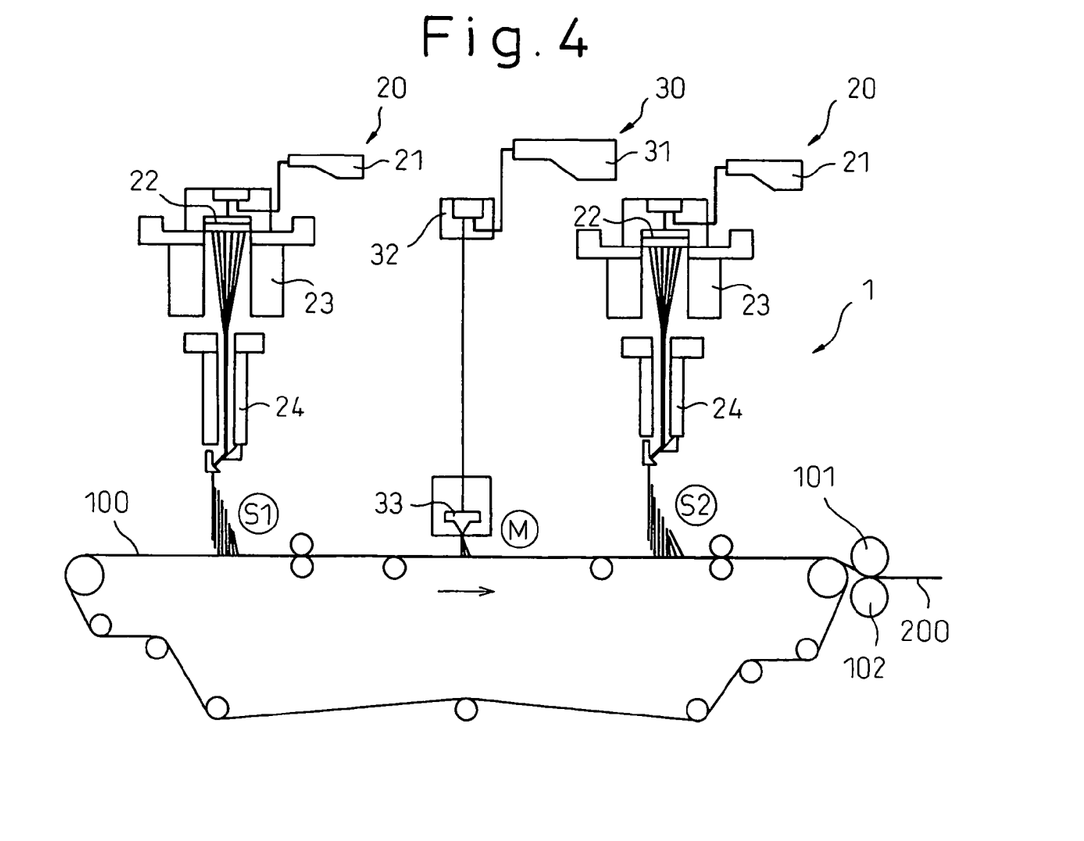
FIG. 4 is a process view showing one embodiment of a method of producing a highly water pressure-resistant polyester nonwoven fabric according to the present invention.

FIG. 4 shows a conceptual view of the continuous production process of the highly water pressure-resistant polyester nonwoven fabric according to the present invention. In the continuous production process in FIG. 4, a highly water pressure-resistant polyester nonwoven fabric (200) according to the present invention is prepared as illustrated below: a filamentary fiber spun-bonded web (S1) spun from a spun-bonded nonwoven fabric spinning unit (20) that is installed in the upper left end portion in FIG. 4 is deposited on an endless collecting net (100) proceeding from the left to the right in FIG. 4; a sheet-like web (M) composed of extremely fine fibers having a given size and spun from a melt blow spinning apparatus (30) that is installed in the upper central portion in FIG. 4 is deposited on the filamentary fiber spun-bonded web; a filamentary fiber spun-bonded web (S2) spun from another spun-bonded nonwoven fabric spinning unit (20) that is installed in the upper right portion (downstream side) in FIG. 4 is deposited on the extremely fine fiber layer (M) face to give a three layer nonwoven fabric stacked sheet having a filamentary fiber nonwoven fabric (S1)/extremely fine fiber nonwoven fabric (M)/filamentary fiber nonwoven fabric (S2) structure; the three layer nonwoven fabric stacked sheet is further transferred to the right by a collecting transfer belt, withdrawn outside from the end portion, and passed through hot calenders (101), (102) so that the three layer nonwoven fabric structure is fixed. As a result of using such a process, a process wherein one or more filamentary fiber nonwoven fabric layers spun on a conveyor net for collecting a web are stacked, and one or more extremely fine fiber nonwoven fabric layers spun on the same conveyor net are stacked by placing the latter fabric layers on the former fabric layers can be further repeated to readily give a stacked structure sheet wherein one or more spun filamentary fiber nonwoven fabric layers and one or more optional number of extremely fine fiber nonwoven fabric layers are stacked on the same conveyor net. In FIG. 4, the reference numerals designate as follows: 21: extruder; 22: spun bond spinning nozzles; 23: cooling chamber; 24: sucker; 31: extruder; 32: gear pump; and 33: melt flow spinning nozzles.

Use of two or more layers of filamentary fiber nonwoven fabric has the following advantages: when unevenness face formation or a deficient portion such as pinholes, turn up, turning or lift up is generated, for example, in one spinning machine, the remaining other nonwoven fabric can cover the deficient portion; therefore the effects of keeping the stacked structure of the extremely fine fiber nonwoven fabric layers can be made more uniform over the entire faces of the nonwoven fabric structure. Similarly, use of multilayers of the extremely fine fiber nonwoven fabric has the following advantages: when uneven formation or a deficient portion such as pinholes is generated, for example, in one spinning machine, the remaining other nonwoven fabric can cover the deficient portion of the former nonwoven fabric; therefore, the procedure can preferably suppress a variation in the physical properties (water pressure resistance in particular).

The laminated nonwoven fabric structure must be integrated and fixed by thermocompressive bonding the nonwoven fabric layers and fibers within the structure.

In order to obtain a high water pressure resistance of the integrated structure by thermocompressive bonding, it is desirable to cause uniform thermal bonding among layer-to-layer faces with, for example, metal flat rolls.

Thermal bonding is conducted at temperatures from 180 to 245° C. However, surface fluff is formed at low temperature, and the mixed polyolefin resin is melted and drops at a high temperature. Accordingly, the thermal bonding temperature is preferably from 190 to 230° C. Moreover, the stacked structure is pressurized during thermal bonding at pressure from 1 to 30 t/m (tons/m), and preferably 2 t/m or more when suppression of surface fluff formation is taken into consideration. In order to completely suppress surface fluff formation, the integrated structure may also be subjected to flattening processing with calender rolls after one step pressing.

Because thermocompressive bonding of the stacked structure with flat rolls does not impair the extremely fine fiber layer in contrast to thermocompressive bonding thereof with emboss rolls in which emboss portions are impaired, the former thermocompressive bonding is preferred in order to manifest the water resistance as much as possible. However, thermocompressive bonding with emboss rolls may also be conducted. Although there is no specific limitation on the emboss shape and emboss ratio in the partial adhesion with emboss rolls, partial adhesion of from 5 to 40% of an emboss area ratio is preferred.

The laminated nonwoven fabric prepared by integration through thermocompressive bonding can be made to have further improved water resistance by applying water-repellent treatment thereto using a water repellent such as a silicone type water repellent and a fluorine type water repellent.

Because the highly water pressure-resistant polyester nonwoven fabric of the present invention contains an extremely fine fiber nonwoven fabric layer within a laminated nonwoven fabric structure, the nonwoven fabric is excellent in bacteria-barrier properties as well as filtering properties. Although the nonwoven fabric contains a polyolefin, it contains a large amount of a polyester resin as a laminated nonwoven fabric structure and is excellent in radiation resistance. Furthermore, the nonwoven fabric is irradiated with an electron beam with an intensity of from 20 to 60 kGy by Japan Electron Beam Irradiation Service K.K., and the retention of tensile tenacity based on that of the same woven fabric that is not irradiated therewith is evaluated. When the same laminated nonwoven fabrics are heat sealed, or when the laminated nonwoven fabric and a film prepared by laminating a polypropylene film for heat sealing to a PET film and used as a sterilization packaging material and the like are heat sealed, the nonwoven fabric shows an excellent peel strength, and neither fluff formation nor shape change, because it contains a polyolefin.

Forming a polyester nonwoven fabric laminate as explained above in the present invention permits obtaining a highly water pressure-resistant polyester nonwoven fabric showing high air permeability, moisture permeability, heat resistance and tensile strength.

BEST MODE FOR CARRYING OUT THE INVENTION

The present invention will be further explained in detail by making reference to examples. However, the present invention is not restricted to specific embodiments alone mentioned in these examples.

In addition, evaluation methods of specific properties in the examples are as explained below.

(1) Measurement of Fiber Diameter (μm) of Constituent Fibers in Nonwoven Fabric

With the selvedge ends cut off by 10 cm width each, a produced nonwoven fabric is divided into 5 equal parts in the CD direction, and a test piece, 1 cm×1 cm, is sampled. The test piece is separated into an extremely fine fiber layer and a filamentary fiber nonwoven fabric layer using a microscope. The diameter at 50 points of each layer is measured with a microscope (trade name of High-Magnification Microscope VH-8000, manufactured by KEYENCE Co., Ltd.), and the fiber diameter is calculated from the average value (numerical values beyond the first place of decimals being rounded).

(2) Measurement of Water Pressure Resistance (kPa)

With the selvedge ends cut off by 10 cm width each, a produced nonwoven fabric is divided into 5 equal parts in the CD direction, and 3 equal parts in the MD direction. A test piece, 20 cm×20 cm, is sampled from each of the resultant 15 areas. Measurements of the water pressure resistance are made on the samples in accordance with JIS L 1092. The average value of the measured values is calculated, and defined as the water pressure resistance.

In addition, for a nonwoven fabric having an average water pressure resistance of 1 kPa or more, in order to exclude the possibility of instantaneous manifestation of an apparent water resistance during measurement, the following procedure is conducted. A water pressure of 1 kPa is applied to the nonwoven fabric with the apparatus, and that no water leakage is taking place is confirmed during the pressure application. The nonwoven fabric is then allowed to stand for 24 hours while the water pressure is being applied, and whether there is water leakage or not is confirmed. When water leakage takes place, the water pressure resistance is defined as 0.

No water leakage taking place after allowing the nonwoven fabric to stand for 24 hours: ○

Water leakage taking place after allowing the nonwoven fabric to stand for 24 hours: X (3) Measurement of Tensile Strength (N/3 cm)

With the selvedge ends cut off by 10 cm width each, a produced nonwoven fabric is divided into 5 equal parts in the CD direction, and 3 equal parts in the MD direction. A test piece, 3 cm×20 cm, in the CD direction and a test piece, 3 cm×20 cm, in the MD direction are sampled from each of the resultant 15 areas. Each test piece is attached to a tensile testing machine of low speed elongation test type with a grip-to-grip distance of 10 cm, and load is applied thereto at a tensile speed of 30 cm/min until breakage thereof takes place. The average value of the tensile strength of test pieces during maximum loading in the MD direction, and the average value of that of test pieces during maximum loading in the CD direction are determined, and the tensile strength is calculated from the following formula (numerical values beyond the first place of decimals being rounded):

Tensile strength=(average value in the *MD* direction+ average value in the *CD* direction)/2(*N*/3 cm)

(4) Wet Surface Tension Test

An extremely fine fiber nonwoven fabric layer used as a layer component and a laminated nonwoven fabric are sampled. Reagents each having a surface tension different from the others are successively used so that a reagent having a higher surface tension is used first, and the starting level of wetting and impregnation is observed. In addition, a reagent is dropped on each sample in an amount of from 2 to 3 drops.

Reagents: manufactured by Wako Chemicals Co., Ltd.

Component: ethylene glycol, monoethyl ether and formamide

Surface tension: 54-34 mN/m (distilled water: 76 mN/m)

(5) Heat Resistance Test

With the selvedge ends cut off by 10 cm width each, a produced nonwoven fabric is divided into 3 equal parts in the CD direction, and 3 equal parts in the MD direction. A test piece, 20 cm×30 cm, in the CD direction and a test piece, 20 cm×30 cm, in the MD direction are sampled from each of the resultant 9 areas. Each sample is heat treated in a hot air oven in an atmosphere at 90° C. at an air blowing speed of 1 m/min, and the tensile strength (in the MD or CD direction) is measured. Average values of retention of tenacity based on the data prior to heat treatment are obtained.

(6) Powder Leakage Test with the selvedge ends cut off by 10 cm width each, a produced nonwoven fabric is divided into 3 equal parts in the CD direction, and 3 equal parts in the MD direction. A test piece, 20 cm×30 cm, in the CD direction and a test piece, 20 cm×30 cm, in the MD direction are sampled from each of the resultant 9 areas. Using a low tap sieve-shaking apparatus (type R-2, manufactured by Tanaka Kagakukiki K.K.), each test piece is subjected to a powder leakage test under the following conditions: lime powder having a particle size from 0.7 to 3 μm is used; a rate of sieve-shaking is 270 times/min; and a rate of hitting (up and down) is 156 times/min. Whether powder leakage takes place or not is confirmed, and powder leakage is judged when powder leakage takes place on even only one test piece.

(7) Evaluation of Scattered State of Polyolefin Resin Within Fibers

An extremely fine fiber nonwoven fabric layer used as a layer component is sampled, held in a wrapping cage, and immersed for 4 hours in o-dichlorobenzene heated to 150° C. in an oil bath. The nonwoven fabric samples subsequent to the heating treatment are each held between glass plates, and subjected to vacuum drying (40° C. for 15 hours). The presence of a polyolefin resin in the samples subsequent to the treatment is confirmed by SEM observation and DSC measurements.

The apparatus and conditions used in the measurements are as explained below.

① SEM Observation Conditions:

apparatus: S-4100 (trade name, manufactured by Hitachi Ltd.)

acceleration voltage: 1.5 kV pretreatment: Pt—Pd vapor deposition, 0.1 Torr, 4.5 mA×2 min (IB-5 Type Ion-Coater (trade name, manufactured by Eiko Engineering Co., Ltd.))

② DSC Measurement Conditions:

apparatus: DSC 210 (trade name, manufactured by S11 Nanotechnology K.K.)

measurement atmosphere: nitrogen (gas flow rate: 50 ml/min)

measurement temperature: room temperature to 300° C.

heating rate: 10° C./min (8) Bacteria-Permeability Test

With the selvedge ends cut off by 10 cm width each, a produced nonwoven fabric is divided into 3 equal parts in the CD direction, and a test piece, 5 cm×5 cm in the MD and CD direction, is sampled. The test piece is subjected to high pressure steam sterilization at 121° C. for 15 minutes, and used as a sample. Such samples are each placed on an agar flat plate medium, and 0.5 ml of a bacteria solution of *Escherichia coli* is dropped thereon, followed by allowing the samples to stand at room temperature. One sample is removed from the agar flat plate medium after 1 hour, another sample is removed after 3 hours, and the other sample is removed after 24 hours. The flat plate media are cultured at 35∓1° C. for 2 days, and the number of colonies growing on each medium is measured.

① Test bacteria: *Escherichia coli* NBRC 3301 (*Escherichia coli*)

② Test medium NA medium: ordinary agar medium (Eiken Kagaku Co., Ltd.)

SA medium: standard agar medium (Eiken Kagaku Co., Ltd.)

③ Preparation of bacteria solution—Test bacteria are cultured in an NA medium at 35∓1° C. for 18 to 24 hours. The bacteria bodies of the test bacteria thus obtained are suspended in sterilized physiological saline, and the solution is adjusted to contain from $10^2$ to $10^3$ of bacteria per ml. The solution is defined as a bacteria solution.

In addition, the number of living bacteria of the bacteria solution is measured by a plate culture method (culturing at 35∓1° C. for 2 days) using a SA medium.

EXAMPLES 1 TO 7, COMPARATIVE EXAMPLES 1 TO 2

A three-layer lamination structure that has an upper and a lower filamentary fiber nonwoven fabric layer each layer having a METSUKE of 25 g/m² and an intermediate extremely fine fiber layer covered with the upper and lower layers and having a METSUKE of 10 g/m² was integrated by thermocompressively bonding the structure at 210° C. and a line pressure of 3.5 t/m with flat rolls. The material of the filamentary fiber nonwoven fabric layers was a polyester alone and had a fiber diameter of 13 μm. The polyester material for the extremely fine fiber nonwoven fabric layer showed a solution viscosity of 0.48 $\eta_{sp}/c$, and was mixed with 1% by weight (example 1), 10% by weight (Example 2), 30% by weight (Example 3), 50% by weight (Example 4) or 75% by weight (Example 5) of a polypropylene showing a MFR of 700 g/10 min. In Comparative Example 1, the same polyester material alone was used without mixing with the polypropylene for the extremely fine fiber nonwoven fabric layer. In Comparative Example 2, the same polypropylene alone was used therefor. In Comparative Examples 1 and 2, the fiber diameter of the extremely fine fiber layer was 2 μm.

Moreover, Example 6 was carried out in the same manner as in Example 3 except that the same polyester material for the filamentary fiber nonwoven fabric layer was mixed with 3% by weight of the same polypropylene.

Furthermore, Example 7 was carried out in the same manner as in Example 3 except that the METSUKE of the filamentary fiber nonwoven fabric layer and that of the extremely fine fiber nonwoven fabric layer were made 16.5 g/m² and 7 g/m², respectively. Still furthermore, Example 8 was carried out in the same manner as in Example 3 except that emboss rolls having weave patterns with an emboss ratio of 15% were used. The stacked structures were thermocompressively bonded at 210° C. and a line pressure of 3.5 t/m to give laminated nonwoven fabrics. Table 1 and FIG. 1 show the results of evaluating the tenacity and water resistance of the fabrics.

Although the tenacity became high when the extremely fine fiber layer contained no polypropylene, the water resistance decreased to less than 2 kPa. Although addition of a polypropylene tended to lower the tenacity to some extent, it clearly improved the water resistance. Moreover, thermocompressive bonding with emboss rolls lowered the water resistance to some extent in comparison with flat rolls. However, the resultant laminated nonwoven fabric could have a water resistance as high as 2 kPa or more, and a substantially unchanged tenacity. However, when the extremely fine fiber nonwoven fabric layer is prepared from a polypropylene material alone, the resultant laminated nonwoven fabric has the following drawbacks: the polypropylene is melted and flows out during thermocompressive bonding to destroy the fiber structure of the extremely fine fiber nonwoven fabric layer and form cracks and pinholes, and no improvement of the water pressure resistance is observed; moreover, in order to maintain the fiber structure of the extremely fine fiber nonwoven fabric layer, the roll temperature must be lowered during thermocompressive bonding, which makes suppression of surface fluff formation difficult, which decreases the peel tenacity and tensile tenacity, and which makes the appearance and shape of the laminate poor.

TABLE 1

|  | Ex. 1 | Ex. 2 | Ex. 3 | Ex. 4 | Ex. 5 |
|---|---|---|---|---|---|
| Total METSUKE (=basis of weight) of stacked structure (g/m²) | 60 | 60 | 60 | 60 | 60 |
| Filamentary fiber nonwoven fabric layer (g/m²) (METSUKE (=basis of weight)) | 50 (25 × 2) | 50 (25 × 2) | 50 (25 × 2) | 50 (25 × 2) | 50 (25 × 2) |
| Extremely fine fiber nonwoven fabric layer (g/m²) (METSUKE = basis of weight) | 10 | 10 | 10 | 10 | 10 |
| Filamentary fiber nonwoven fabric layer (%) (PP mixing amount) | 0 | 0 | 0 | 0 | 0 |
| Type of hot emboss rolls | Flat | Flat | Flat | Flat | Flat |
| Extremely fine fiber nonwoven fabric layer (%) (PP mixing amount) | 1 | 10 | 30 | 50 | 75 |
| Tensile tenacity (N/3 cm) | 113 | 109 | 91 | 86 | 81 |
| Water pressure resistance (kPa) | 3.7 | 8.6 | 8.9 | 8.0 | 5.2 |
| Content of polyester resin in laminate (wt. %) | 99.8 | 98.3 | 95.0 | 91.7 | 87.5 |
| Leakage after 24 hours | No | No | No | No | No |

|  | Ex. 6 | Ex. 7 | Ex. 8 | C. Ex. 1 | C. Ex. 2 |
|---|---|---|---|---|---|
| Total METSUKE (=basis of weight) of stacked structure (g/m²) | 60 | 40 | 60 | 60 | 60 |
| Filamentary fiber nonwoven fabric layer (g/m²) (METSUKE = basis of weight) | 50 (25 × 2) | 33 (16.5 × 2) | 50 (25 × 2) | 50 (25 × 2) | 50 (25 × 2) |
| Extremely fine fiber nonwoven fabric layer (g/m²) (METSUKE = basis of weight) | 10 | 7 | 10 | 10 | 10 |
| Filamentary fiber nonwoven fabric layer (%) (PP mixing amount) | 3 | 0 | 0 | 0 | 0 |

TABLE 1-continued

| Type of hot emboss rolls | Flat | Flat | Weave pattern | Flat | Flat |
|---|---|---|---|---|---|
| Extremely fine fiber nonwoven fabric layer (%) (PP mixing amount) | 30 | 30 | 30 | 0 | 100 |
| Tensile tenacity (N/3 cm) | 89 | 64 | 90 | 114 | 73 |
| Water pressure resistance (kPa) | 9.4 | 4.2 | 5.7 | 0 | 0 |
| Content of polyester resin in laminate (wt. %) | 92.5 | 94.8 | 95.0 | 100 | 83.3 |
| Leakage after 24 hours | No | No | No | Yes | Yes |

EXAMPLE 9

On the same conveyor net, two filamentary fiber nonwoven fabric layers were stacked, and two extremely fine fiber nonwoven fabric layers were further stacked, followed by further stacking one filamentary fiber nonwoven fabric layer. For the resultant 5 layer structure, the METSUKE was as follows: 12.5 g/m² for each of the first and second filamentary fiber nonwoven fabric layers; 5 g/m² for each of the third and fourth extremely fine fiber nonwoven fabric layers; and 25 g/m² for the fifth filamentary fiber nonwoven fabric layer. The stacked structure was integrated by thermocompressive bonding at 210° C. and a line pressure of 3.5 t/m with flat rolls. The material of the filamentary fiber nonwoven fabric layers was a polyester alone and had a fiber diameter of 13 μm. The polyester material for the extremely fine fiber nonwoven fabric layer showing a solution viscosity of 0.48 $\eta_{sp}/c$ was mixed with 30% by weight (example 9) of a polypropylene having a MFR of 700 g/10 min. The fiber diameter of the extremely fine fiber nonwoven fabric layer was 2 μm. Table 2 shows the test results.

The laminated nonwoven fabric showed a somewhat higher average water pressure resistance in comparison with the laminated nonwoven fabric prepared from the three-layer structure. Moreover, the former showed a higher lowest water resistance measured in comparison with the latter. The results are derived by uniforming the guard effects of the extremely fine fiber nonwoven fabric layers in the filamentary fiber nonwoven fabric layers and by the effects of uniforming the formation of the extremely fine fiber nonwoven fabric layers.

TABLE 2

|  | Example 3 | Example 9 |
|---|---|---|
| Structure layers | 3 layers | 5 layers |
| Construction | S/M/S | S/S/M/M/S |
| Tensile tenacity (N/3 cm) | 91 | 93 |
| Water pressure resistance (kPa) | 8.9 | 9.3 |
| Lowest water pressure resistance (kPa) | 7.2 | 7.8 |
| Leakage after 24 hours | Yes | Yes |

Note:
S = filamentary fiber nonwoven fabric layer
M = extremely fine fiber nonwoven fabric layer

EXAMPLES 10 TO 11

In Example 10, a laminated nonwoven fabric was prepared in the same manner as in Example 3 except that a material for the extremely fine fiber nonwoven fabric layer was prepared by mixing the polyester material with 30% of a HDPE showing a MFR of 53 g/10 min, and that the fiber diameter was made 2 μm. In Example 11, a laminated nonwoven fabric was prepared in the same manner as in Example 3 except that a material for the extremely fine fiber nonwoven fabric layer was prepared by mixing the polyester material with 30% of a LDPE showing a MFR of 132 g/10 min, and that the fiber diameter was made 2 μm. Table 3 shows the results of evaluating the tenacity and water resistance of test pieces sampled from the resultant laminated nonwoven fabrics.

It can be understood that similarly to the preparation of the extremely fine fiber nonwoven fabric layer by mixing the polyester material with a polypropylene, the water resistance can be improved even when the type of polyethylene is changed.

TABLE 3

|  | Example 10 | Example 11 |
|---|---|---|
| Extremely fine fiber nonwoven fabric layer (added material) | HDPE | LDPE |
| Tensile tenacity (N/3 cm) | 94 | 92 |
| Water pressure resistance | 4.4 | 7.1 |
| Leakage after 24 hours | No | Yes |

EXAMPLES 12 TO 13, COMPARATIVE EXAMPLE 3

In Example 12, a laminated nonwoven fabric was prepared in the same manner as in Example 3 except that the fiber diameter of the extremely fine fiber nonwoven fabric layer was made 1.5 μm. In Example 13, a laminated nonwoven fabric was prepared in the same manner as in Example 3 except that the fiber diameter of the extremely fine fiber nonwoven fabric layer was made 2.8 μm. In Comparative Example 3, a laminated nonwoven fabric was prepared in the same manner as in Example 3 except that the fiber diameter of the extremely fine fiber nonwoven fabric layer was made 6.0 μm. Table 4 shows the results of evaluating the tenacity and water resistance of test pieces sampled from the laminated nonwoven fabrics. Although the tenacity substantially shows no change when the fiber diameter of the extremely fine fiber nonwoven fabric layer exceeds 5 μm, the water resistance lowers because the covering effects in the extremely fine fiber layer are decreased.

TABLE 4

|  | Example 12 | Example 13 | Comparative Example 3 |
|---|---|---|---|
| Extremely fine fiber nonwoven fabric layer (fiber diameter) (μm) | 1.5 | 2.8 | 6.0 |
| Tensile tenacity (N/3 cm) | 93 | 91 | 90 |
| Water pressure resistance (kPa) | 11.1 | 3.0 | 1.8 |
| Leakage after 24 hours | No | No | No |

EXAMPLE 14, COMPARATIVE EXAMPLES 4 TO 5

In Example 14, a laminated nonwoven fabric was prepared in the same manner as in Example 3 except that the total METSUKE and the METSUKE of the extremely fine fiber nonwoven fabric layer were made 10 g/m² and 2 g/m², respectively. In Comparative Example 4, a laminated nonwoven fabric was prepared in the same manner as in Example 3 except that the total METSUKE and the METSUKE of the extremely fine fiber nonwoven fabric layer were made 10 g/m² and 1 g/m², respectively. In Comparative Example 5, a laminated nonwoven fabric was prepared in the same manner as in Example 3 except that the total METSUKE and the METSUKE of the extremely fine fiber nonwoven fabric layer were made 10 g/m² and 4 g/m², respectively. Table 5 shows the results of evaluating the tenacity and water resistance of test pieces sampled from the resultant laminated nonwoven fabrics.

When the METSUKE of the extremely fine fiber nonwoven fabric layer is 1 g/m², a high water pressure resistance cannot be manifested because the absolute amount of the extremely fine fiber layer decreases to lower the covering effects. Moreover, when the METSUKE of the extremely fine fiber layer is 4 g/m², the tenacity of the filamentary fiber nonwoven fabric layers holding the extremely fine fiber layer decreases to less than 13 N/3 cm and, as a result, a high water pressure resistance cannot be manifested.

TABLE 5

|  | Example 14 | Comparative Example 4 | Comparative Example 5 |
|---|---|---|---|
| METSUKE (=basis of weight) of extremely fine fiber nonwoven fabric layer (g/m²) | 2 | 1 | 4 |
| METSUKE (=basis of weight) of filamentary fiber nonwoven fabric layer (g/m²) | 8 | 9 | 6 |
| Tensile tenacity (N/3 cm) | 15 | 18 | 12 |
| Water pressure resistance (kPa) | 2.1 | 1.5 | 1.3 |
| Leakage after 24 hours | No | No | No |

EXAMPLES 15 TO 22, COMPARATIVE EXAMPLE 5

Laminated nonwoven fabrics were each prepared from the following extremely fine fiber nonwoven fabric layers each having a METSUKE of 30 g/m² and a fiber diameter of 2 µm: an extremely fine fiber nonwoven fabric layer in which a polyester material was mixed with 1% by weight of a polypropylene having a MFR of 700 g/10 min (Example 15); an extremely fine fiber nonwoven fabric layer in which a polyester material was mixed with 30% by weight of the polypropylene (Example 16); an extremely fine fiber nonwoven fabric layer in which a polyester material was mixed with 50% by weight of the polypropylene (Example 17); an extremely fine fiber nonwoven fabric layer in which a polyester material was mixed with 75% by weight of the polypropylene (Example 18); and an extremely fine fiber nonwoven fabric layer in which a polyester material alone was used (Comparative Example 5). A laminated nonwoven fabric was prepared in the same manner as in Example 14 except that a polypropylene having a MFR of 40 g/10 min was used (Example 19). A laminated nonwoven fabric was prepared in the same manner as in Example 14 except that a polypropylene having a MFR of 1,500 g/10 min was used (Example 20). The laminated structure in Example 6 was used as a laminated nonwoven fabric (Example 22). The laminated structure in Comparative Example 6 was used as a laminated nonwoven fabric (Comparative Example 6). A wet and tension test was carried out on the above laminated nonwoven fabrics, and Table 6 shows the results.

It should be understood that when the extremely fine fiber nonwoven fabric layer contains no polypropylene, the fabric layer is impregnated even with a reagent having a high surface tension, and that when it contains a polypropylene, the fabric layer is not impregnated even with a reagent having a low surface tension.

Furthermore, even when the MFR of the polyethylene to be mixed is changed, no change of the surface tension of a reagent with which the fabric layer is impregnated takes place. Still furthermore, it is understood that when the extremely fine fiber nonwoven fabric layer contains no polypropylene, the integrated stacked structure having the filamentary fiber nonwoven fabric layers is similarly impregnated with a reagent having a high surface tension, and that when it contains a polypropylene, the integrated structure is not impregnated even with a reagent having a low surface tension. It is also understood that the integrated stacked structure having a filamentary fiber nonwoven fabric layer that contains a polypropylene is not impregnated even with a reagent having a still lower surface tension. As these results show, mixing the polyester with a polypropylene allows the resultant extremely fine fiber nonwoven fabric layer or integrated stacked structure to be hardly impregnated even with a reagent having a low surface tension. The fact can therefore be taken as one factor in water impermeability (improvement of the water resistance).

TABLE 6

|  | Ex. 15 | Ex. 16 | Ex. 17 | Ex. 18 | Ex. 19 |
|---|---|---|---|---|---|
| Total METSUKE (=basis of weight) of stacked structure | 30 | 30 | 30 | 30 | 30 |
| Filamentary fiber nonwoven fabric layer (g/m²) (METSUKE = basis of weight) | — | — | — | — | — |
| Extremely fine fiber nonwoven fabric layer (g/m²) (METSUKE = basis of weight) | 30 | 30 | 30 | 30 | 30 |
| Filamentary fiber nonwoven fabric layer (%) (PP mixing amount) | — | — | — | — | — |
| Extremely fine fiber nonwoven fabric layer (%) (PP mixing amount) | 1 | 30 | 50 | 75 | 30 |
| MFR of added PP in extremely fine fiber nonwoven fabric layer g/10 min | 700 | 700 | 700 | 700 | 40 |
| Surface tension of reagent impregnation of which in the laminated fabric could be confirmed (mN/m) | 50 | 39 | 36 | 36 | 39 |

|  | Ex. 20 | Ex. 21 | Ex. 22 | C. Ex. 6 | C. Ex. 7 |
|---|---|---|---|---|---|
| Total METSUKE (=basis of weight) of stacked structure | 30 | 60 | 60 | 30 | 60 |
| Filamentary fiber nonwoven fabric layer (g/m²) (METSUKE (=basis of weight)) | — | 50 (25 × 2) | 50 (25 × 2) | — | 50 (25 × 2) |
| Extremely fine fiber nonwoven fabric layer (g/m²) | 30 | 10 | 10 | 30 | 10 |

TABLE 6-continued

| (METSUKE (=basis of weight)) Filamentary fiber nonwoven fabric layer (%) | — | — | 3 | — | — |
|---|---|---|---|---|---|
| (PP mixing amount) Extremely fine fiber nonwoven fabric layer (%) | 30 | 30 | 30 | 0 | 0 |
| (PP mixing amount) MFR of added PP in extremely fine fiber nonwoven fabric layer g/10 min | 1500 | 700 | 700 | — | — |
| Surface tension of reagent impregnation of which in the laminated fabric could be confirmed (mN/m) | 39 | 36 | 34 | 54< | 54< |

EXAMPLES 23 TO 26

Samples of the laminate in Example 3 were heat treated in a hot-air oven for 200 hours (Example 23), and for 1,200 hours (Example 24). Moreover, samples of the laminate in Example 4 were heat treated in a hot-air oven for 200 hours (Example 25) and for 1,200 hours (Example 26). Table 7 shows the results of evaluating the retention of tenacity of the samples thus heat treated. It is understood that the laminates show no substantial decrease of tenacity 1,200 hours after the heat treatment for 1,200 hours even when a polypropylene is added to the extremely fine fiber nonwoven fabric layers.

TABLE 7

|  | Example 23 | Example 24 | Example 25 | Example 26 |
|---|---|---|---|---|
| Exposure time (hr) | 200 | 1200 | 200 | 1200 |
| Extremely fine fiber nonwoven fabric layer (PP mixing amount) (%) | 30 | 30 | 50 | 50 |
| Retention of tensile tenacity (%) | 101 | 99 | 100 | 99 |

EXAMPLE 27

Table 8 shows the results of evaluating powder leakage of the laminate in Example 3 using a sieve-shaking apparatus. No powder leakage took place even when a powder (lime) having a particle size of about 0.7 μm was used due to the filtering effects of the extremely fine fiber nonwoven fabric layer. It is therefore understood that the laminate is useful as a dry (lime) packaging material, and the like.

TABLE 8

|  | Example 27 |
|---|---|
| Powder leakage (Yes/No) | No |

EXAMPLE 28

Table 9 shows the results of carrying out a bacteria-permeability test (Example 28) on the laminate in Example 3.

TABLE 9

|  | Example 28 |
|---|---|
| Number of colonies after 24 hours | 0 |

No growing colonies were found on the medium after allowing the laminate to stand for 24 hours because the bacteria solution did not permeate the laminate. It is therefore understood that the laminate is excellent in bacteria-barrier properties.

EXAMPLES 29 TO 31, COMPARATIVE EXAMPLES 8 TO 13

Figure 2:
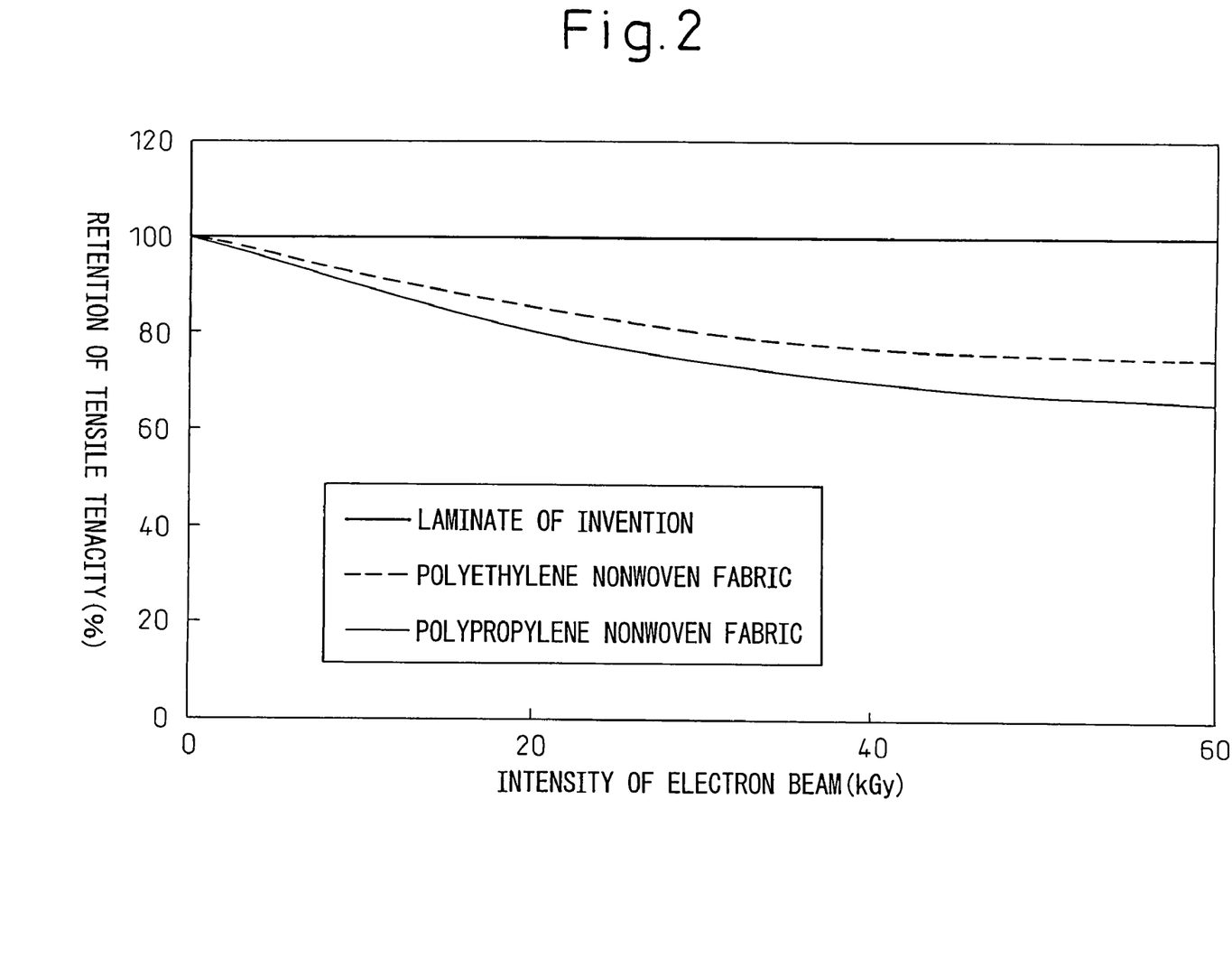
FIG. 2 shows a curve of a retention of tensile tenacity after irradiating a laminated nonwoven fabric of the present invention with an electron beam.

Three samples of the laminate in Example 3 were irradiated with an electron beam at an intensity of 20 kGy (Example 29), 40 kGy (Example 30) and 60 kGy (Example 31), respectively. Moreover, three samples of a polyethylene nonwoven fabric prepared by flash spinning were similarly irradiated with an electron beam at an intensity of 20 kGy (Comparative Example 8), 40 kGy (Comparative Example 9) and 60 kGy (Comparative Example 10), respectively. Furthermore, three samples of a spun-bonded/melt-blown/spun-bonded laminate were irradiated with an electron beam at an intensity of 20 kGy (Comparative Example 11), 40 kGy (Comparative Example 12) and 60 kGy (Comparative Example 13), respectively. After irradiation, the tensile tenacity of the samples was measured. Table 10 and FIG. 2 show the results of evaluating the retention of tensile tenacity based on the tensile tenacity prior to irradiation.

TABLE 10

|  | Ex. 29 | Ex. 30 | Ex. 31 | C. Ex. 8 | C. Ex. 9 | C. Ex. 10 | C. Ex. 11 | C. Ex. 12 | C. Ex. 13 |
|---|---|---|---|---|---|---|---|---|---|
| Irradiation intensity of electron beam (kGy) | 20 | 40 | 60 | 20 | 40 | 60 | 20 | 40 | 60 |
| Retention of tensile tenacity (%) | 100 | 100 | 100 | 85 | 77 | 75 | 81 | 70 | 65 |

It is understood that the laminate of the invention in Example 3 shows no change in a tensile tenacity even when the laminate is irradiated with an electron beam at an intensity of 60 kGy and is excellent in radiation resistance. However, it is also understood that the polyethylene nonwoven fabric and polypropylene nonwoven fabric decrease the tensile tenacity with an increase in irradiation intensity of an electron beam.

INDUSTRIAL APPLICABILITY

The highly water pressure-resistant polyester nonwoven fabric of the present invention ensures various well balanced properties such as excellent heat resistance, radiation resistance and barriering properties as well as excellent water resistance and large tensile strength. For reasons mentioned above, the polyester nonwoven fabric is a nonwoven fabric material appropriate to moisture-permeable waterproof sheets used for building materials and shoe materials and, moreover, to fields requiring filtering properties, for example, various packaging materials such as a dry packaging material and a sterilization packaging material used as a packaging material.

The invention claimed is:

1. A highly water pressure-resistant polyester nonwoven fabric composed of a laminated nonwoven fabric structure, the structure comprising an extremely fine fiber nonwoven fabric layer formed out of extremely fine fibers formed by melt blowing an extruded mixture of a polyester resin and from 10 to 50% by weight of a polyolefin resin based on the weight of the mixture, said fibers having a fiber diameter of 5 μm or less, and a filamentary fiber nonwoven fabric layer composed of a polyester resin containing 7% by weight or less of a polyolefin resin and having a fiber diameter of 7 μm or more, said layers being integrated together by thermocompressive bonding to form the laminated structure, wherein the extremely fine fibers forming the extremely fine fiber nonwoven fabric are formed out of a polyester resin having a solution viscosity from 0.2 to 0.8 $\eta_{sp}$/C, the polyolefin resin mixed with the polyester resin forming the extremely fine fibers has a MFR (melt flow rate), which is determined under a temperature of 230° C. and a load of 21.18 N in accordance with JIS K 7210, of 500 to 3,000 g/10 min, a discontinuous phase of the polyolefin resin is scattered on a surface and in a longitudinally aligned direction of the extremely fine fibers, the extremely fine fibers do not have a sheath-core structure, and the laminated structure has a water pressure resistance of 5.2 kPa or more.

2. The highly water pressure-resistant polyester nonwoven fabric according to claim 1, wherein the laminated nonwoven fabric structure has a polyester resin content of 70% by weight or more.

3. The highly water pressure-resistant polyester nonwoven fabric according to claim 1, wherein the basis of weight of the laminated structure is 10 g/m² or more, the basis of weight of the filamentary fiber nonwoven fabric layer is 8 g/m² or more, the basis of weight of the extremely fine fiber nonwoven fabric layer is 2 g/m² or more, and the laminated structure has a tensile tenacity of 13 N/3 cm or more.

4. The highly water pressure-resistant polyester nonwoven fabric according to claim 1, wherein the basis of weight of the filamentary fiber nonwoven fabric layer is 20 g/m² or more, the basis of weight of the extremely fine fiber nonwoven fabric layer is 6 g/m² or more, the basis of weight of the nonwoven fabric laminated structure is 40 g/m² or more, and the nonwoven fabric laminated structure has a tensile tenacity of 60 N/3 cm or more.

5. The highly water pressure-resistant polyester nonwoven fabric according to claim 1, wherein the polyester resin forming the extremely fine fibers has a solution viscosity of from 0.2 to 0.6 $\eta_{sp}$/C.

6. The highly water pressure-resistant polyester nonwoven fabric according to claim 1, wherein the polyolefin resin mixed with the polyester resin forming the extremely fine fibers is a polypropylene or a polyethylene.

7. The highly water pressure-resistant polyester nonwoven fabric according to claim 1, wherein the extremely fine fiber nonwoven fabric layer shows a starting level of wetting and impregnating of 50 mN/m or less when a reagent having a surface tension different from the extremely fine fiber nonwoven fabric layer is dropped thereon.

8. The highly water pressure-resistant polyester nonwoven fabric according to claim 1, wherein the polyester nonwoven fabric is composed of a laminated structure formed by integrating, through thermocompressive bonding, a stacked structure that is formed by successively stacking at least one filamentary fiber nonwoven fabric layer spun and deposited on a conveyor net, at least one extremely fine fiber nonwoven fabric layer deposited on the same conveyor net and at least one filamentary fiber nonwoven fabric layer spun and deposited thereon.

* * * * *